United States Patent
Bonk et al.

(10) Patent No.: US 10,011,192 B2
(45) Date of Patent: Jul. 3, 2018

(54) POSITION-SENSING SYSTEM FOR VEHICLE SEAT

(71) Applicant: Faurecia Automotive Seating, LLC, Auburn Hills, MI (US)

(72) Inventors: Jeffery T. Bonk, Chesterfield, MI (US); Dale J. Frye, West Olive, MI (US); Matthew Shinew, Grand Rapids, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/271,862

(22) Filed: Sep. 21, 2016

(65) Prior Publication Data

US 2017/0080825 A1    Mar. 23, 2017

Related U.S. Application Data

(60) Provisional application No. 62/221,653, filed on Sep. 22, 2015.

(51) Int. Cl.
*B60N 2/02* (2006.01)
*B60N 2/06* (2006.01)
*G01D 5/14* (2006.01)
*B60N 2/20* (2006.01)
*G01D 5/347* (2006.01)

(52) U.S. Cl.
CPC ............. *B60N 2/0244* (2013.01); *B60N 2/06* (2013.01); *B60N 2/20* (2013.01); *G01D 5/145* (2013.01); *G01D 5/34746* (2013.01); *G01D 5/34784* (2013.01); *G01D 5/34792* (2013.01); *B60N 2002/0272* (2013.01)

(58) Field of Classification Search
CPC ......... B60N 2/0244; B60N 2/06; G01D 5/145
See application file for complete search history.

(56) References Cited

U.S. PATENT DOCUMENTS

| | | | |
|---|---|---|---|
| 7,667,345 B2 | 2/2010 | Budweg | |
| 2007/0108748 A1* | 5/2007 | Ventura | B60N 2/06 280/735 |
| 2009/0079248 A1* | 3/2009 | Keyser | B60N 2/0232 297/362.11 |

\* cited by examiner

*Primary Examiner* — Basil T. Jos
(74) *Attorney, Agent, or Firm* — Barnes & Thornburg LLP (57) ABSTRACT

A vehicle seat includes a seat bottom and a seat back. The seat back is coupled to the seat bottom and arranged to extend in an upward direction away from the seat bottom. The vehicle seat further includes an electronics system.

14 Claims, 7 Drawing Sheets

POSITION-SENSING SYSTEM FOR VEHICLE SEAT

PRIORITY CLAIM

This application claims priority under 35 U.S.C. § 119(e) to U.S. Provisional Application Ser. No. 62/221,653, filed Sep. 22, 2015, which is expressly incorporated by reference herein.

BACKGROUND

The present disclosure relates to a vehicle seat and in particular to a vehicle seat including a sensor. More particularly, the present disclosure relates to a vehicle seat including one or more sensors coupled to an electronic controller for a vehicle seat.

SUMMARY

A vehicle seat in accordance with the present disclosure includes a seat bottom and a seat back. The seat back is coupled to the seat bottom and arranged to extend in an upward direction away from the seat bottom.

In illustrative embodiments, the vehicle seat includes a foundation comprising a rail and a rail receiver, a magnetic feature, and a magnetic sensor coupled to the foundation, and a seat controller coupled to the magnetic sensor. The rail is coupled to the seat bottom of the vehicle seat and the rail receiver defines a track to receive the rail and to allow the rail to move along a predefined linear path. The magnetic sensor is configured to generate sensor data in response to sensing the magnetic feature of the rail. The seat controller is configured to determine a position of the rail along the predefined linear path as a function of the sensor data generated by the magnetic sensor.

In illustrative embodiments, the magnetic feature is coupled to the rail of the foundation and the magnetic sensor is coupled to the rail receiver of the foundation. In illustrative embodiments, the magnetic feature may be coupled to the rail receiver of the foundation, and the magnetic sensor may be coupled to the rail of the foundation.

In illustrative embodiments, the magnetic feature comprises a magnetic stripe and the sensor data is indicative of magnetic field strength of the magnetic feature in proximity to the magnetic sensor. To determine the position of the rail along the predefined linear path may include a linear function of the magnetic field strength.

In illustrative embodiments, the magnetic feature comprises a magnetic stripe, the sensor data is indicative of magnetic field strength of the magnetic feature in proximity to the magnetic sensor, and to determine the position of the rail along the predetermined linear path may include determining a sequence of magnetic field strength values based on the sensor data and decode the sequence of magnetic field strength values to determine the position. In illustrative embodiments, the magnetic feature may include a magnetic stripe including a plurality of magnetic signal tracks, the sensor data is indicative of a plurality of magnetic field strength values, wherein each magnetic fields strength value is associated with a signal track of the magnetic feature in proximity to the magnetic sensor, and to determine the position of the rail along the predetermined linear path may include to decode the plurality of magnetic field strength values to determine the position.

In illustrative embodiments, the vehicle seat includes a first member, a second member coupled to the first member, a visual feature coupled to the first member, an optical sensor coupled to the second member, and a seat controller coupled to the optical sensor. The second member is configured to move rotationally relative to the first member. The optical sensor is configured to generate sensor data indicative of the visual feature, and the seat controller is configured to determine a rotational position of the second member relative to the first member as a function of the sensor data generated by the optical sensor. In illustrative embodiments, the first member may include the seat bottom and the second member may include the seat back. In illustrative embodiments, the first member may include the seat back and the second member may include the seat bottom. In illustrative embodiments, the optical sensor may include a camera, a photodiode, or a photocell. In illustrative embodiments, the visual feature may include a color gradient or a shape.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
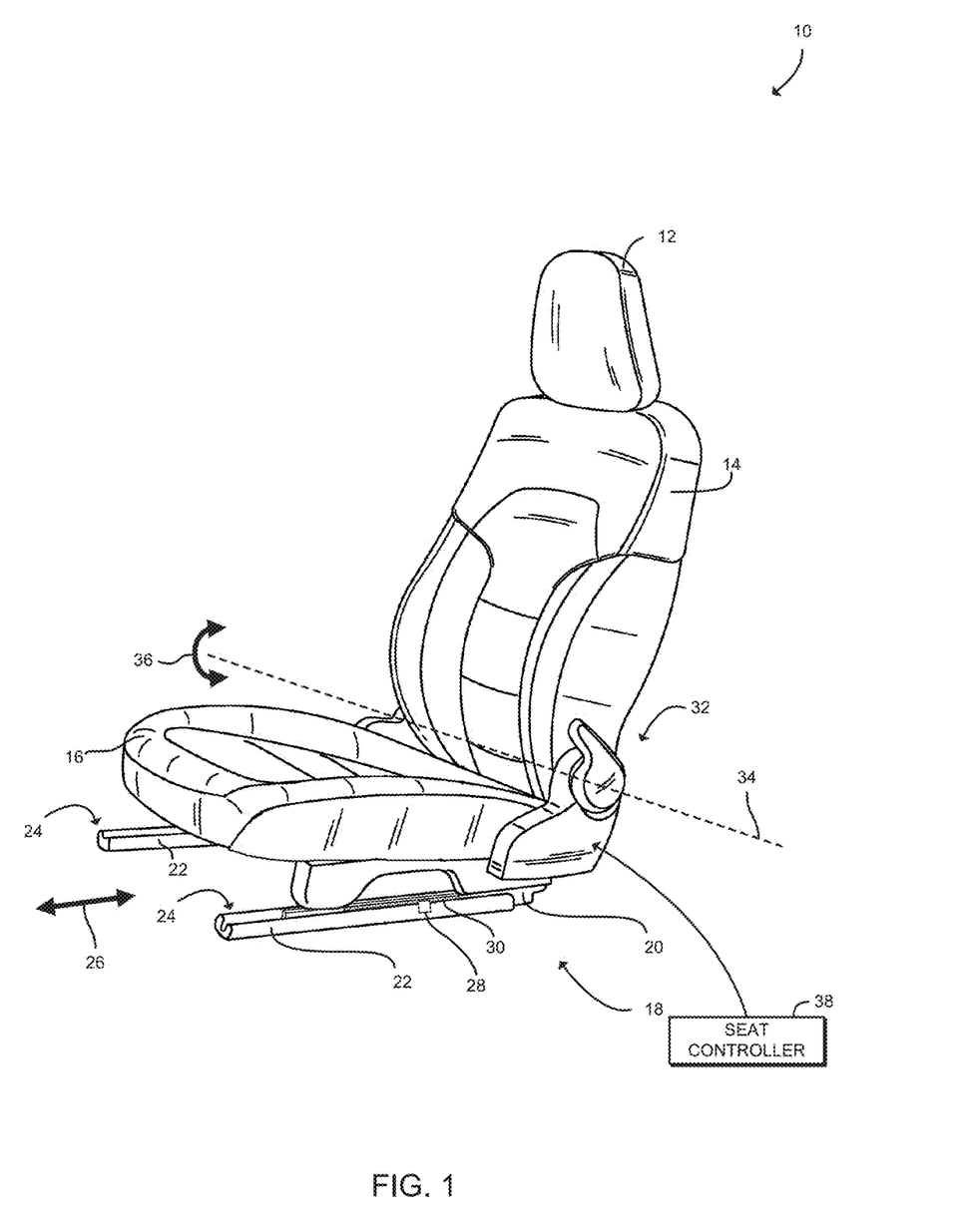
FIG. 1 is a perspective and diagrammatic view of a vehicle seat in accordance with the present disclosure showing that the vehicle seat includes a magnetic feature and a magnetic sensor that senses the magnetic feature.
Figure 2:
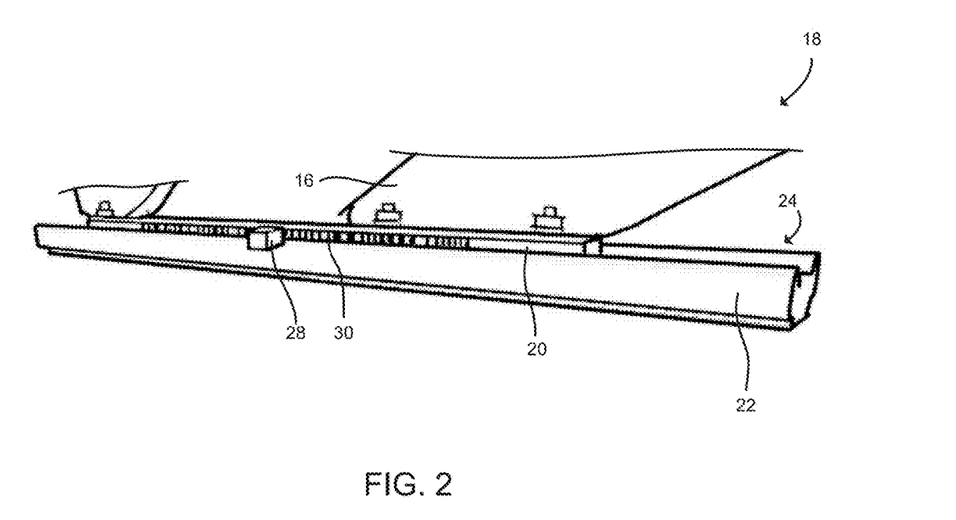
FIG. 2 is a perspective view of part of the vehicle seat of FIG. 1 showing that the magnetic feature is included on a seat rail, the magnetic sensor is attached to a rail receiver, and the magnetic feature slides past the magnetic sensor.

A first embodiment of a vehicle seat 10 in accordance with the present disclosure is shown, for example, in FIGS. 1 and 2. Vehicle seat 10 includes a headrest 12, a backrest 14, and a seat bottom 16. In some embodiments, headrest 12, backrest 14, and/or the seat bottom 16 may be movable or otherwise adjustable, for example adjustable for seat bottom angle, seat back recline, and/or head restraint position. Vehicle seat 10 is coupled to a foundation 18 and foundation 18 may be attached to a vehicle such as a car or a truck (not shown) to provide seating for the vehicle's driver and/or other occupants.

Foundation 18 includes a pair of seat rails 20 and a pair of rail receivers 22. As shown, each of seat rails 20 attaches to seat bottom 16 and extends longitudinally. Foundation 18 includes an inboard seat rail 20 and an outboard seat rail 20. Other embodiments the foundation 18 may include a different number and/or arrangement of seat rails 20. Each of rail receivers 22 defines a track 24 to receive a seat rail 20. Track 24 allows seat rail 20—and the attached seat bottom 16—to move along a predefined longitudinal path 26 with respect to the vehicle. In some embodiments, vehicle seat 10 may include a seat mover (not shown) to move automatically the seat rail 20 along the longitudinal path 26.

Vehicle seat 10 includes a magnetic sensor 28 coupled to one of rail receivers 22. Magnetic sensor 28 may be embodied as any electronic sensor capable of measuring magnetic field strength. Corresponding seat rail 20 includes a magnetic feature 30 which may be embodied as a magnetic stripe or any other magnetic feature detectible by the magnetic sensor 28. Magnetic feature 30 may be applied to the corresponding seat rail 20 or may be embedded in the seat rail 20 during manufacturing.

For example, in some embodiments, parts of the seat rail 20 may be magnetized selectively during manufacturing. Magnetic sensor 28 is configured to sense magnetic field strength associated with magnetic feature 30 as magnetic feature 30 moves relative to magnetic sensor 28. Various techniques for determining the position of the seat rails 20 and/or the seat bottom 16 are described further below in connection with FIGS. 4-8. Although illustrative vehicle seat 10 includes a single magnetic sensor 28 and magnetic feature 30, vehicle seat 10 may include any number of suitable magnetic sensors 28 and/or magnetic features 30 coupled to rail receivers 22 and/or seat rails 20, respectively.

Figure 3:
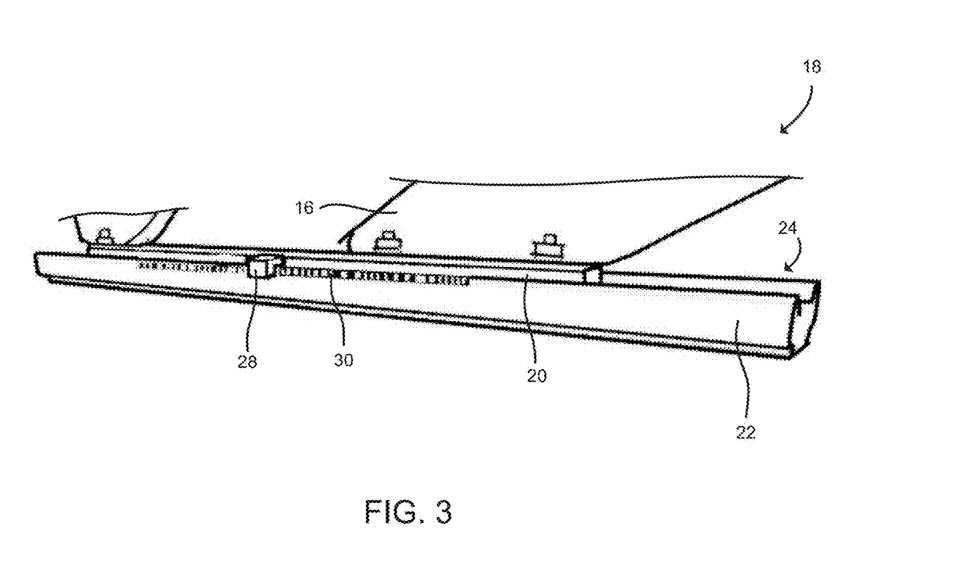
FIG. 3 is a perspective view of part of another embodiment of a vehicle seat in accordance with the present disclosure showing that the magnetic feature is included on the rail receiver, the magnetic sensor is attached to the rail, and the magnetic sensor slides past the magnetic feature.

As shown in FIG. 3, in some embodiments magnetic feature 30 is included on the rail receiver 22 and magnetic sensor 28 may be coupled to seat rail 20. In those embodiments, magnetic feature 30 may be applied to the corresponding rail receiver 22 or may be embedded in the rail receiver 22 during manufacturing. In those embodiments, magnetic sensor 28 is configured to sense magnetic field strength associated with magnetic feature 30 as magnetic sensor 28 moves relative to the magnetic feature 30.

As shown in FIG. 1, illustrative vehicle seat 10 further includes a tilt unit 32 coupling seat back 14 and seat bottom 16. Tilt unit 32 allows seat back 14 to rotate relative to seat bottom 16 about a tilt axis 34. Thus, tilt unit 32 allows seat back 14 to rotate along a predefined rotational path 36. Rotational position sensors to determine the rotational position of seat back 14 are described further below in connection with FIGS. 9 and 10.

Vehicle seat 10 further includes a seat controller 38, which may be embodied as an electronic control unit or other controller configured to control the functions of the vehicle seat 10. Seat controller 38 is configured to determine the position of seat rails 20 and/or vehicle seat 10 based on sensor data read from magnetic sensor 28. Seat controller 38 may be configured to determine the rotational position of seat back 14 relative to seat bottom 16 based on sensor data read from one or more magnetic sensors. Vehicle seat 10 is capable of determining seat position without using potentiometers and without counting motor turns using a Hall-effect sensor. Vehicle seat 10 may reduce costs compared to other sensor technologies. Vehicle seat 10 may provide improved reliability compared to contact sensors such as potentiometers.

Figure 9:
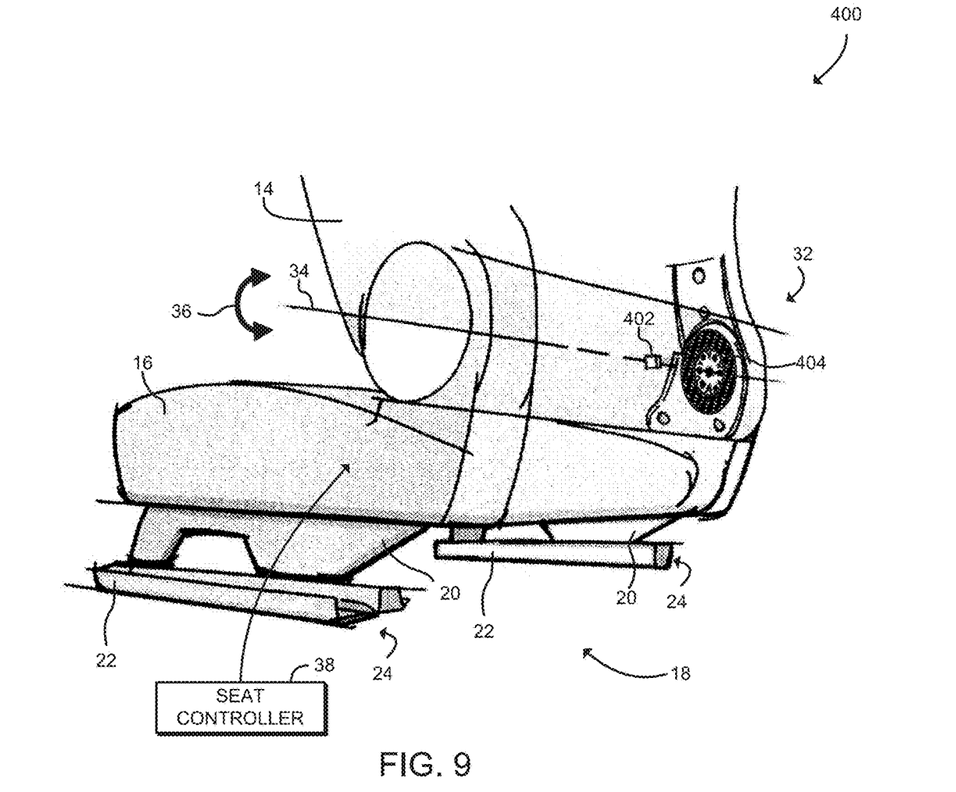
FIG. 9 is a perspective and diagrammatic view of a vehicle seat in accordance with the present disclosure showing that the vehicle seat includes a visual feature and an optical sensor that senses the visual feature.

Seat controller 38 may be positioned underneath or within seat bottom 16 as shown in FIGS. 1 and 9. In some embodiments, seat controller 38 may include or be otherwise coupled with a side shield positioned on the outside of vehicle seat 10. The side shield may include one or more buttons, switches, or other user controls that allow the user to interact with and otherwise control vehicle seat 10.

Seat controller 38 may be embodied as any device capable of performing the functions described herein. For example, seat controller 38 may be embodied as an electronic control unit, embedded controller, control circuit, microcontroller, computing device, on-board computer, and/or any other any other computing device capable of performing the functions described herein. Seat controller 38 may include typical components of an electronic control unit, including a processor, an I/O subsystem, a memory, a data storage device, and communication circuitry. Seat controller 38 may include other or additional components, such as those commonly found in an electronic control unit (e.g., various input/output devices), in other embodiments.

In some embodiments, one or more of the illustrative components may be incorporated in, or otherwise form a portion of, another component. For example, the memory, or portions thereof, may be incorporated in the processor in some embodiments. Additionally, although illustrated as a separate seat controller 38, in some embodiments part or all of the functionality of the seat controller 38 may be performed by magnetic sensor 28, for example by an embedded microcontroller included or otherwise coupled to magnetic sensor 28.

The processor may be embodied as any type of processor capable of performing the functions described herein. For example, the processor may be embodied as a microcontroller, digital signal processor, single or multi-core processor(s), or other processor or processing/controlling circuit. Similarly, the memory may be embodied as any type of volatile or non-volatile memory or data storage capable of performing the functions described herein. In operation, the memory may store various data and software used during operation of the processor such as operating systems, applications, programs, libraries, and drivers. The memory is coupled to the processor via the I/O subsystem, which may be embodied as circuitry and/or components to facilitate input/output operations with the processor, the memory, and other components of seat controller 38. For example, the I/O subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor, the memory, and other components of the seat controller 38, on a single integrated circuit chip.

The data storage device may be embodied as any type of device or devices configured for short-term or long-term storage of data such as, for example, memory devices and circuits, memory cards, hard disk drives, solid-state drives, read-only memory, or other data storage devices. The communication circuitry of seat controller 38 may be embodied as any communication circuit, device, or collection thereof, capable of enabling communications between seat controller 38 and other devices of vehicle seat 10 and/or the vehicle. The communication circuitry may be configured to use any one or more communication technology (e.g., wireless or wired communications) and associated protocols (e.g., Ethernet, controller area network (CAN), local interconnect network (LIN), Bluetooth®, Wi-Fi®, etc.) to effect such communication.

Figure 4:
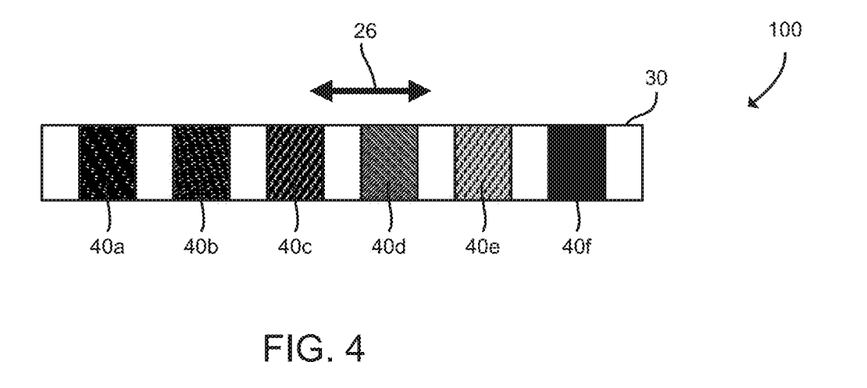
FIG. 4 is a schematic diagram illustrating at least one embodiment of the magnetic feature of FIGS. 1-3.

As shown in FIG. 4, schematic diagram 100 illustrates one potential embodiment of a magnetic feature 30. As shown, magnetic feature 30 is linear and arranged to extend along predefined longitudinal path 26. For example, magnetic feature 30 may be embodied as a magnetic stripe extending along a seat rail 20 and/or a rail receiver 22. As shown, magnetic feature 30 includes several magnetic regions 40. Each magnetic region 40 is positioned at a particular location within magnetic feature 30. Each magnetic region 40 has an associated magnetic field. Magnetic field strength of each magnetic region 40 is represented by shading. For example, in the illustrative embodiment, magnetic region 40a has the weakest magnetic field and magnetic region 40f has the highest magnetic field. Although illustrated as including six magnetic regions 40, magnetic feature 30 may include any number of magnetic regions 40. Increasing the number of magnetic regions 40 may increase the resolution of the seat position value that may be determined.

Figure 5:
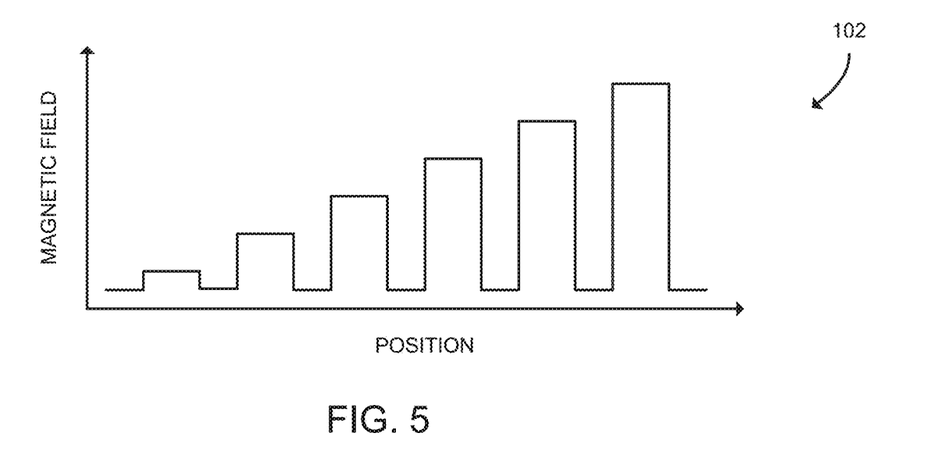
FIG. 5 is an plot showing illustrative sensor data that may be indicative of the magnetic feature of FIG. 4.

As shown in FIG. 5, plot 102 illustrates magnetic field strength plotted against position for magnetic feature 30 of diagram 100. As shown, each magnetic field region 40 of magnetic feature 30 has a magnetic field with a different strength. Seat controller 38 or other sensing system may determine position of seat rail 20 by measuring the analog magnetic field strength value using the magnetic sensor 28 (e.g., by measuring the field strength in gauss) and converting the magnetic field strength value to a position value. Each measured magnetic field value corresponds to a particular position value. Thus, seat controller 38 may only make a single measurement of magnetic field strength to determine the position value, and no home position is required to be measured. As shown in FIG. 5, the position value and the magnetic field strength value may be proportional or otherwise linearly related.

Figure 6:
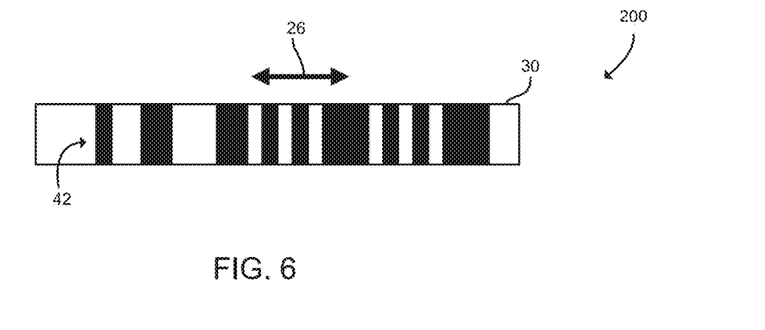
FIG. 6 is a schematic diagram illustrating one embodiment of the magnetic feature of FIGS. 1-3.

As shown in FIG. 6, schematic diagram 200 illustrates another potential embodiment of a magnetic feature 30. As shown, magnetic feature 30 is linear and arranged to extend along predefined longitudinal path 26. Magnetic feature 30 may be embodied as a magnetic stripe extending along a seat rail 20 and/or a rail receiver 22. Magnetic feature 30 includes a track 42 that includes a sequence of magnetic regions. Each of the magnetic regions has either a high magnetic field strength or a low magnetic field strength. Track 42 corresponds to a sequence of binary values. Seat controller 38 may read a sequence of binary values from magnetic sensor 28 for a position within magnetic feature 30 and then decode the sequence of binary values to determine the position value.

Figure 7:
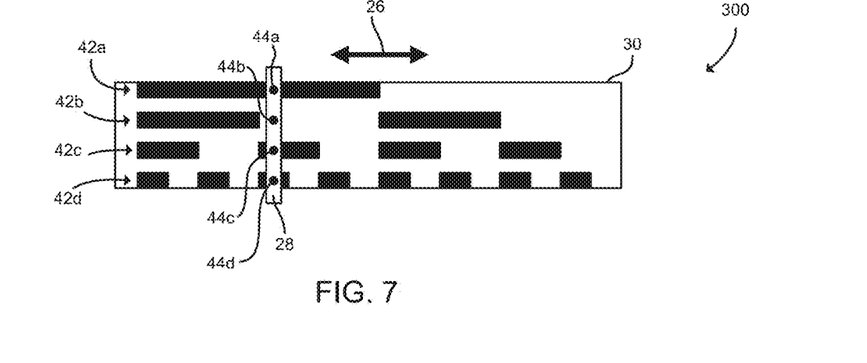
FIG. 7 is a schematic diagram illustrating one embodiment of the magnetic feature of FIGS. 1-3.

As shown in FIG. 7, schematic diagram 300 illustrates another potential embodiment of a magnetic feature 30. As shown, magnetic feature 30 is linear and arranged to extend along predefined longitudinal path 26. Magnetic feature 30 may be embodied as a magnetic stripe extending along a seat rail 20 and/or a rail receiver 22. Magnetic feature 30 includes four tracks 42 that each include a sequence of magnetic regions. As described above in connection with FIG. 6, each of the magnetic regions has either a high magnetic field strength or a low magnetic field strength. Each track 42 of magnetic regions corresponds to a sequence of binary values. Magnetic sensor 28 includes several read heads 44 with each read head 44 positioned opposite a corresponding track 42. Seat controller 38 may read a binary value from each of the read heads 44 and decode the binary values to determine the position value.

Figure 8:
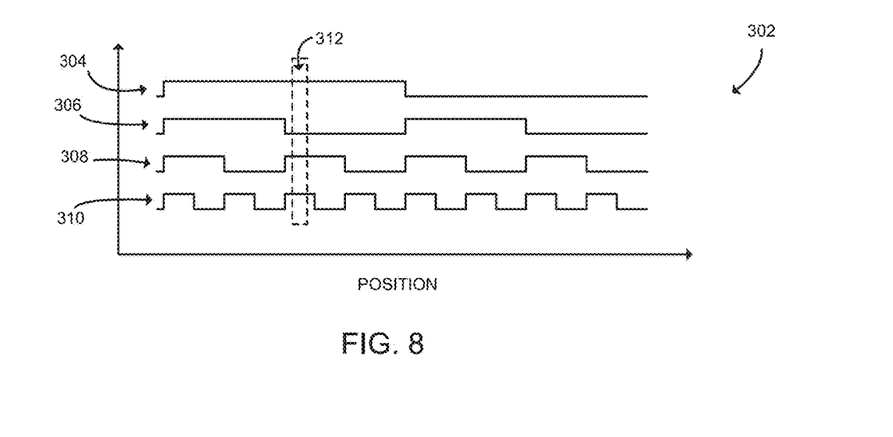
FIG. 8 is an plot showing illustrative sensor data that may be indicative of the magnetic feature of FIG. 7.

As shown in FIG. 8, plot 302 illustrates sensor data that may be produced by magnetic sensor 28. The waveform 304 represents magnetic field strength of the track 42a measured by read head 44a. The waveform 306 represents magnetic field strength of the track 42b measured by read head 44b. The waveform 308 represents magnetic field strength of the track 42c measured by read head 44c. The waveform 310 represents magnetic field strength of the track 42d measured by read head 44d. As shown, each permutation of binary values (e.g., 1111, 1110, etc.) may correspond to a particular position along magnetic feature 30. For example, area 312 illustrates binary values that may be generated by magnetic sensor 28 when located in the position shown in FIG. 7.

Magnetic feature 30 of FIG. 7 includes four tracks 42a through 42d and four corresponding read heads 44a through 44d. Magnetic feature 30 may have a resolution of 16 positions. In some embodiments, magnetic sensor 28 may be capable of measuring magnetic field values with a positional resolution of five millimeters. Thus, in an illustrative embodiment that supports 16 possible positions at a resolution of five millimeters each, magnetic feature 30 may be capable of measuring position within a total travel of 80 millimeters. It should be understood that in other embodiments a different number of tracks 42 and read heads 44 may be used. To support finer positional resolution and/or additional total travel, magnetic feature 30 and magnetic sensor 28 may include additional tracks 42 and read heads 44, respectively. For example, in another embodiment, to support a total travel of 220 millimeters with five millimeter resolution (i.e., 44 possible positions), magnetic feature 30 may include six tracks 42. As another example, to support a total travel of 400 millimeters with five millimeter resolution (i.e., 80 possible positions), magnetic feature 30 may include seven tracks 42.

Figure 10:
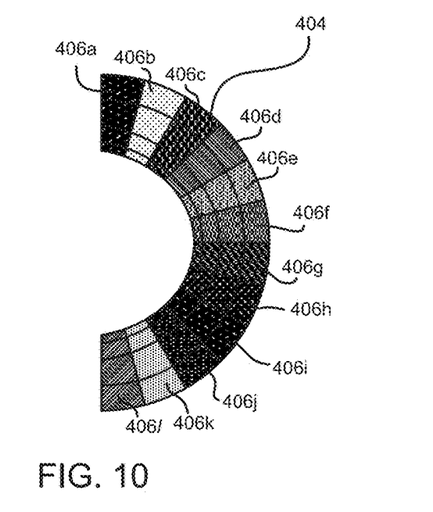
FIG. 10 is a schematic diagram illustrating at least one embodiment of the visual feature of FIG. 9.

As shown in FIGS. 9 and 10, a diagram 400 illustrates another embodiment of a vehicle seat 10 in accordance with the present disclosure. Vehicle seat 10 includes headrest 12, backrest 14, and a seat bottom 16. Vehicle seat 10 is coupled to foundation 18 and foundation 18 may be attached to a vehicle such as a car or a truck (not shown) to provide seating for the vehicle's driver and/or other occupants. Foundation 18 includes pair of seat rails 20 attached to the seat bottom 16 and pair of rail receivers 22 that define track 24 to receive seat rails 20.

Vehicle seat 10 further includes tilt unit 32 coupling the seat back 14 and the seat bottom 16. Tilt unit 32 allows seat back 14 to rotate relative to the seat bottom 16 about tilt axis 34. Tilt unit 32 allows seat back 14 to rotate along a predefined rotational path 36. Vehicle seat 10 of FIGS. 9 and 10 is capable of measuring angular position of seat back 14 along predefined rotational path 36.

Vehicle seat 10 includes an optical sensor 402. Optical sensor 402 is coupled to seat bottom 16 along tilt axis 34 and thus remains fixed relative to the seat bottom 16 as seat back 14 rotates about the tilt axis 34. Optical sensor 402 may be embodied as any electronic sensor capable of measuring light intensity, color, or other visual information. In some embodiments, optical sensor 402 may be capable of capturing image data. Optical sensor 402 may be embodied as, for example, a photodiode, a photocell, a digital camera, an ambient light sensor, or any other appropriate photo sensor. Vehicle seat 10 may also include a light source for optical sensor 402, such as an LED light (not shown). The spectral content of the light source should match the spectral response of optical sensor 402. Vehicle seat 10 may include a shroud or other aperture to prevent light generated by the light source from directly entering optical sensor 402.

Vehicle seat 10 further includes a visual feature 404, which may be embodied as any feature of vehicle seat 10 that varies visually with the rotation of backrest 14 relative to seat bottom 16. For example, visual feature 404 may be embodied as printed markings similar to a color wheel as shown in FIG. 10. As another example, visual feature 404 may be embodied as structural or mechanical features of seat back 14 and/or seat bottom 16 such as a bolt pattern or other visual features of tilt unit 32. As yet another example, visual feature 404 may be embodied as one or more geometric shapes that vary visually relative to rotational and/or linear position along visual feature 404. For example, visual feature 404 may be embodied as a printed and/or etched triangle shape with a base at one end of visual feature 404 that extends to a vertex at the other end of visual feature 404.

In some embodiments, vehicle seat 10 may include a reference feature having a solid, fixed brightness and/or color (e.g., a solid white or gray stripe) that may be compared to visual feature 404. In those embodiments, vehicle seat 10 may include an additional optical sensor 402 to measure the intensity and/or color of light reflected from the reference feature.

Visual feature 404 is attached to backrest 14 around tilt axis 34 and thus rotates about tilt axis 34. Although vehicle seat 10 has optical sensor 402 fixed with respect to seat bottom 16 and visual feature 404 fixed with respect to backrest 14, in some embodiments, optical sensor 402 may be fixed with respect to backrest 14 and visual feature 404 may be fixed with respect to seat bottom 16. Vehicle seat 10 may include a shroud or other aperture to allow light reflected by visual feature 404 (for example, light generated by a light source) to enter optical sensor 402.

Although illustrated in FIG. 9 as including a separate seat controller 38, in some embodiments, part or all of the functionality of seat controller 38 may be performed by the optical sensor 402, for example by an embedded microcontroller included or otherwise coupled to the optical sensor 402.

As shown in FIG. 10, one potential embodiment of a visual feature 404 is shown. Visual feature 404 is an arc including multiple segments 406. Visual feature 404 may be, for example, applied to backrest 14 or included in backrest 14 during manufacturing. Each segment 406 has a different color, which is represented in FIG. 10 by shading. Each color thus corresponds to a particular angular position value. Seat controller 38 may measure color using optical sensor 402 and then determine the angular position value based on the measured color. For example, seat controller 38 may determine a ratio of red, blue, and green values for the measured color and determine the angular position based on that ratio. Visual feature 404 includes twelve regions 406a through 406l. Increasing the number of colored segments 406 may increase the resolution of the angular seat position value that can be determined. In some embodiments, the color of visual feature 404 may change smoothly, for example, changing smoothly from red to blue. Additionally or alternatively, in some embodiments visual feature 404 may include segments 406 in various shades of gray and optical sensor 402 may measure intensity of the reflected light.

Figure 11:
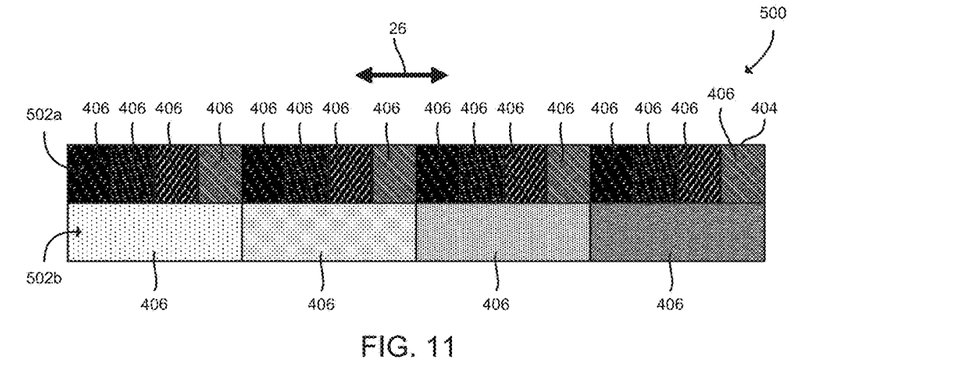
FIG. 11 is a schematic diagram illustrating at least one embodiment of the visual feature of FIG. 9.

As shown in FIG. 11, a schematic diagram 500 illustrates another potential embodiment of a visual feature 404. Visual feature 404 is linear and may be used, for example, to measure position along predefined longitudinal path 26. For example, visual feature 404 may be applied or otherwise fixed to a seat rail 20 and/or a rail receiver 22. Visual feature 404 includes two tracks 502. Each track 502 includes a series of segments 406. In the illustrative embodiment, each segment 406 has a different shade of gray. Vehicle seat 10 may include an optical sensor 402 for each track 502. Each optical sensor 402 measures the intensity of light reflected by corresponding track 502. The combination of measured light intensity values from each optical sensor 402 represents a particular linear position value. For example, seat controller 38 may read light intensity values from optical sensors 402 and determine linear position based on those measured values. Although the illustrative embodiment includes grayscale segments 406, some embodiments each segment 406 may have a different color, and optical sensors 402 may measure the color of the reflected light.

As shown FIG. 11, visual feature 404 may allow for position measurements at a resolution equivalent to the width of the segments 406 of track 502 having the smallest segment width (i.e., track 502a of FIG. 11). For example, in an illustrative embodiment, each segment 406 of track 502a may be five millimeters wide. In that embodiment, an aperture may limit the optical sensor 402 to view only five millimeters of the visual feature 404 at one time. Thus, in the illustrative embodiment, visual feature 404 may allow position measurements at five millimeter resolution over 80 millimeters of total travel. In another embodiment, visual feature 404 may include segments 406 having eight different shades of gray. In that embodiment, track 502a may include 64 segments 406 and the track 502b may include eight segments 406. In that embodiment, visual feature 404 thus may allow position measurements at five millimeter resolution over 320 millimeters of total travel. To provide additional positional resolution and/or total travel, vehicle seat 10 may include additional optical sensors 402 and associated tracks 502.

Figure 12:
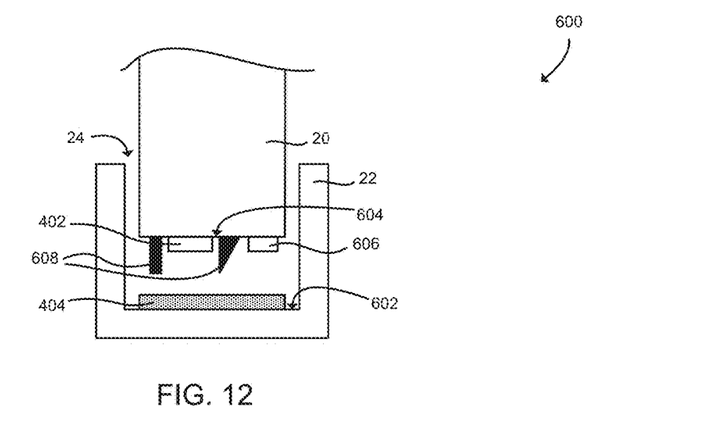
FIG. 12 is a cross-sectional diagrammatic view of a seat rail and rail receiver in accordance with the present disclosure showing that the rail receiver includes a visual feature and the seat rail includes an optical sensor that senses the visual feature.

As shown in FIG. 12, cross-sectional diagram 600 illustrates one potential embodiment of a seat rail 20 and rail receiver 22 according to the present disclosure. As shown, rail receiver 22 defines a track 24 to receive the seat rail 20. Track 24 of rail receiver 22 includes a bottom wall 602, and as shown in the illustrative diagram 600, visual feature 404 is attached or otherwise included on the bottom wall 602. Seat rail 20 further includes a bottom surface 604 that faces bottom wall 602 of track 24. Bottom surface 604 of seat rail 20 and bottom wall 602 of track 24 are separated by an air gap.

Optical sensor 402 is attached to bottom surface 604 of seat rail 20 and thus may measure light reflected by visual feature 404. The illustrative embodiment further includes a light-emitting diode (LED) 606 and a shroud 608 attached to bottom surface 604 of seat rail 20. Light emitted by the LED 606 is blocked by shroud 608 from being directly received by optical sensor 402. Light emitted by the LED 606 may reflect off of visual feature 404 and then reach optical sensor 402 through an aperture in shroud 608. The aperture in shroud 608 may be sized to allow optical sensor 402 to sense one segment 406 of visual feature 404 at a time, for example, being sized to allow optical sensor 402 to sense a five-millimeter square area of visual feature 404.

Figure 13:
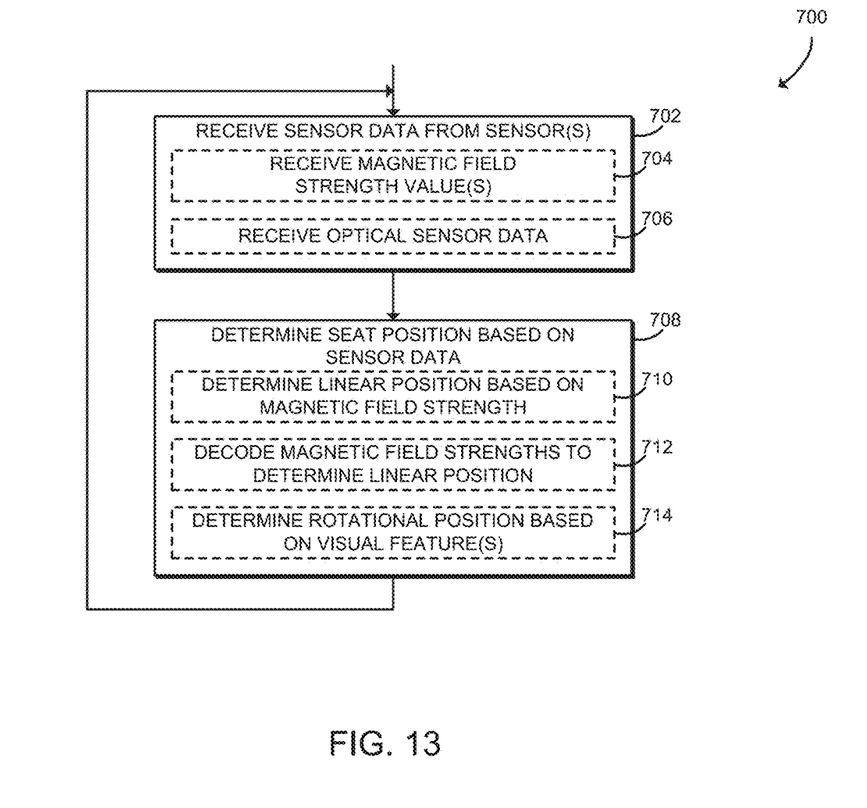
FIG. 13 is a flow diagram illustrating at least one embodiment of a method for determining vehicle seat position that may be executed by the seat controller of FIGS. 1 and 9.

As shown in FIG. 13, in use, seat controller 38 may execute a method 700 for determining seat position. Method 700 begins in block 702 in which seat controller 38 receives sensor data from one or more sensors. In some embodiments, in block 704 seat controller 38 receives magnetic field strength values from one or more magnetic sensors 28. In some embodiments, in block 706, seat controller 38 receives optical sensor data from one or more optical sensors 402. The optical sensor data may be embodied as light intensity values, color values, image data, or other data indicative of visual information measured by optical sensor 402.

In block 708, seat controller 38 determines a seat position value based on the sensor data. In some embodiments, in block 710 seat controller 38 may determine a linear position along predefined longitudinal path 26 based on measured magnetic field strength. Determination of seat position based on measured magnetic field strength is described further above in connection with FIGS. 1-5. In some embodiments, in block 712, seat controller 38 may decode magnetic field strengths associated with one or more tracks 42 of magnetic feature 30 to determine a linear position along the predefined longitudinal path 26. Determination of seat position by decoding a sequence of magnetic field strength values is further described above in connection with FIGS. 1-3 and 6-8. In some embodiments, in block 714, seat controller 38 may determine a rotational position along the predefined rotational path 36 based on visual features determined from the sensor data produced by one or more optical sensors 402. For example, seat controller 38 may determine rotational position based on light intensity data or color data. In some embodiments, seat controller 38 may perform one or more machine vision algorithms to determine rotational position based on image data, for example determining rotational position based on images of a bolt pattern of vehicle seat 10. Determination of seat position based on visual features is described further above in connection with FIGS. 9-12. After determining the seat position based on the sensor data, method 700 loops back to block 702 to continue receiving sensor data.

Referring back to FIGS. 1-3, although illustrated as including a magnetic sensor 28 and a magnetic feature 30 to measure seat position along the predefined longitudinal path 26, in some embodiments vehicle seat 10 may include one or more optical sensors 402 and corresponding visual features 404 to measure seat position along the predefined longitudinal path 26. For example, a visual feature 404 may be attached to rail receiver 22 and an optical sensor 402 may be included on seat rail 20, similar to the arrangement of FIG. 2 and/or FIG. 12.

As another example, a visual feature 404 may be attached to seat rail 20 and an optical sensor 402 may be included on rail receiver 22, similar to the arrangement of FIG. 3. As still another example, a visual feature 404 may be included on a bottom wall of rail receiver 22 within track 24 so that seat rail 20 blocks ambient light from reaching visual feature 404 similar to the arrangement of FIG. 12. In those embodiments, vehicle seat 10 may include a light source (e.g., one or more LEDs) within track 24 of rail receiver 22 to illuminate visual feature 404.

Referring back to FIG. 9, although illustrated as including an optical sensor 402 and a visual feature 404 to measure rotational position along predefined rotational path 36, in some embodiments vehicle seat 10 may include one or more magnetic sensors 28 and corresponding magnetic features 30 to measure rotational position along the predefined rotational path 36. For example, a magnetic sensor 28 may be attached to seat bottom 16 along tilt axis 34 and a magnetic feature 30 may be included in backrest 14, similar to the arrangement of FIG. 9. As another example, a magnetic sensor may be attached to backrest 14 and a magnetic feature 30 may be included in seat bottom 16.

A position sensor in accordance with the present disclosure may be used with a track for a vehicle seat to determine a longitudinal position of the vehicle seat relative to the floor. However, a position sensor in accordance with the present disclosure, may be used to determine a tilt angle of a seat bottom, a height of a seat bottom above the floor, an angular position of a seat back, a height of a headrest relative to a backrest, a length of a cushion included in a seat bottom, or any other position or dimension included in a vehicle seat or other suitable occupant support. Position sensors in accordance with the present disclosure include magnetic sensors and magnetic features and optical sensors and optical features.

An occupant support comprises a stationary component, a movable component coupled to the stationary component to move relative to the stationary component, and a position sensing system. The position sensing system is configured to determine an absolute position of the movable component relative to the stationary component. The position sensing system includes a magnetic feature coupled to the movable component, a magnetic sensor coupled to the stationary component and configured to generate sensor data in response to sensing the magnetic feature, and a controller. The controller is coupled to the magnetic sensor and configured to determine an absolute position of the movable component relative to the stationary component the predefined linear path as a function of the sensor data generated by the magnetic sensor.

A position sensing system in accordance with the present disclosure may be used to determine an absolute or actual location of a moving component relative to a stationary component in an occupant support. In one example, the position sensing system determines a longitudinal position of a movable rail included in a track relative to a stationary rail included in the track. In another example, the position sensing system determines a rotational angle of a moving seat back relative to seat bottom. In another example, the position sensing system determines a height of a moving seat bottom relative a floor of the vehicle. In another example, the position sensing system determines a tilt of a moving seat bottom relative to a floor of the vehicle. In another example, the position sensing system determines a position of an adjustable portion of an adjustable cushion relative to a stationary portion of an adjustable cushion. In another example, the position sensing system determines a location of a moving headrest relative to a backrest included in a seat back. In another example, the position sensing system determines an angle of a moving upper back adjuster relative to a stationary portion of the backrest included in the seat back.

The invention claimed is:
1. A vehicle seat comprising
 a seat bottom,
 a foundation comprising a rail coupled to the seat bottom to move therewith and a rail receiver arranged in a fixed position relative to the seat bottom, the rail receiver defining a track to receive the rail therein and allow the rail to move along a predefined linear path,
 a magnetic feature coupled to the foundation, the magnetic feature comprising a track having a sequence of separated magnetic regions, a magnetic sensor coupled to the foundation and configured to generate sensor data in response to sensing the magnetic feature, and a seat controller coupled to the magnetic sensor and configured to determine a position of the rail along the predefined linear path as a function of the sensor data generated by the magnetic sensor.

2. The vehicle seat of claim 1, wherein the magnetic feature is coupled to the rail of the foundation and the magnetic sensor is coupled to the rail receiver of the foundation.

3. The vehicle seat of claim 1, wherein the magnetic feature is coupled to the rail receiver of the foundation and the magnetic sensor is coupled to the rail of the foundation.

4. The vehicle seat of claim 1, wherein the magnetic feature comprises a magnetic stripe, the sensor data is indicative of magnetic field strength of the magnetic feature in proximity to the magnetic sensor, and to determine the position of the rail along the predefined linear path comprises to determine the position of the rail along the predefined linear path as a linear function of the magnetic field strength.

5. The vehicle seat of claim 1, wherein the magnetic feature comprises a magnetic stripe, the sensor data is indicative of magnetic field strength of the magnetic feature in proximity to the magnetic sensor, and to determine the position of the rail along the predetermined linear path comprises to (i) determine a sequence of magnetic field strength values based on the sensor data and (ii) decode the sequence of magnetic field strength values to determine the position.

6. The vehicle seat of claim 1, wherein the magnetic feature comprises a magnetic stripe including a plurality of magnetic signal tracks, the sensor data is indicative of a plurality of magnetic field strength values, wherein each magnetic fields strength value is associated with a signal track of the magnetic feature in proximity to the magnetic sensor, and to determine the position of the rail along the predetermined linear path comprises to decode the plurality of magnetic field strength values to determine the position.

7. A vehicle seat comprising
a first member,
a second member coupled to the first member and configured to move rotationally relative to the first member,
a visual feature coupled to the first member, wherein the visual feature comprises a color gradient,
an optical sensor coupled to the second member and configured to generate sensor data indicative of the visual feature, and
a seat controller coupled to the optical sensor and configured to determine a position of the second member relative to the first member as a function of the sensor data generated by the optical sensor.

8. The vehicle seat of claim 7, wherein the first member comprises a seat bottom and the second member comprises a seat back.

9. The vehicle seat of claim 7, wherein the first member comprises a seat back and the second member comprises a seat bottom.

10. The vehicle seat of claim 7, wherein the first member comprises a rail and the second member comprises a rail receiver.

11. The vehicle seat of claim 7, wherein the first member comprises a rail receiver and the second member comprises a rail.

12. The vehicle seat of claim 7, wherein the optical sensor comprises a camera.

13. The vehicle seat of claim 7, wherein the optical sensor comprises a photodiode or a photocell.

14. The vehicle seat of claim 7, wherein the visual feature comprises a shape.

* * * * *